C. H. WILLIAMS, Jr.
BRAKE BEAM.
APPLICATION FILED JULY 26, 1909.

955,240.

Patented Apr. 19, 1910.

WITNESSES

INVENTOR
CHARLES H. WILLIAMS JR.
BY
ATT'Y.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

955,240.  Specification of Letters Patent.  Patented Apr. 19, 1910.

Application filed July 26, 1909. Serial No. 509,476.

*To all whom it may concern:*

Be it known that I, CHARLES H. WILLIAMS, Jr., a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1:
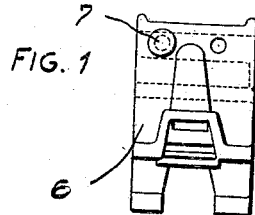
Figure 2:
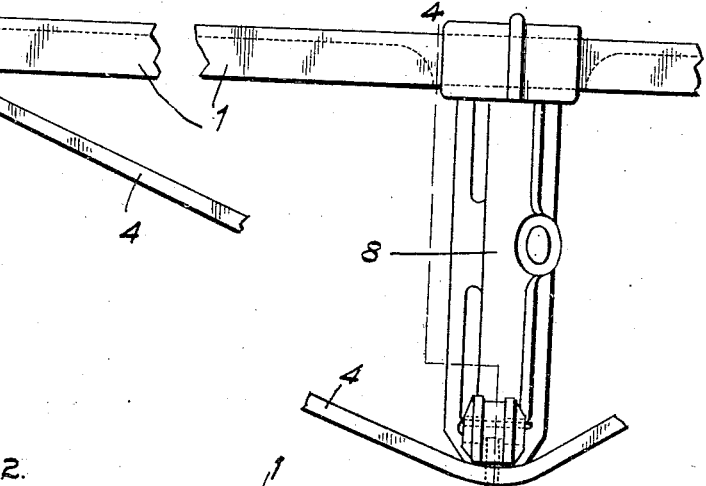
Figure 2:
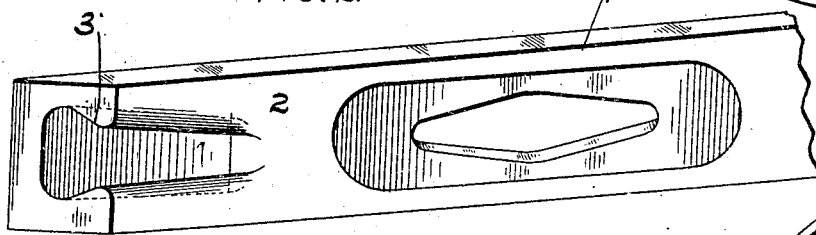
Figure 3:
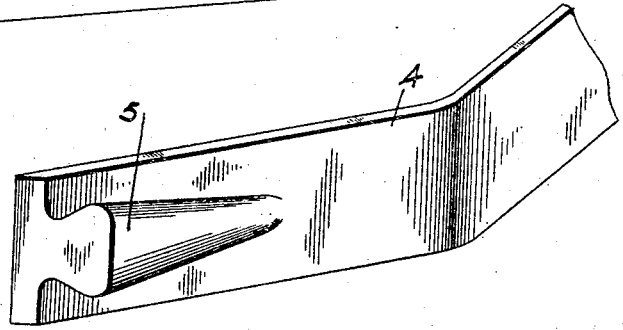
Figure 4:
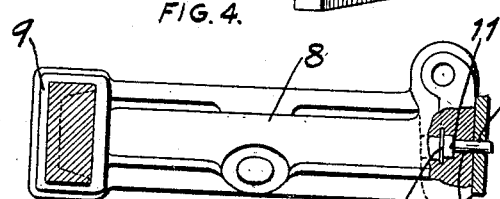
Figure 5:
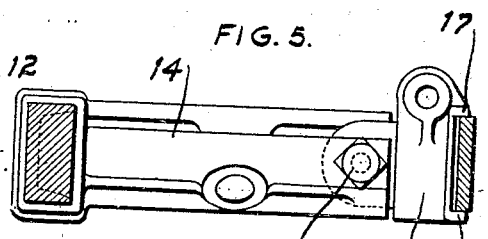
Figure 6:
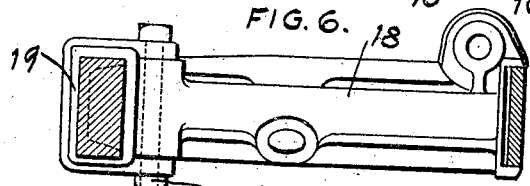
Figure 7:
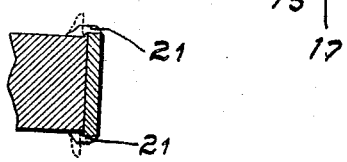

Figure 1 is a plan view of one-half of a brake beam of my improved construction. Fig. 2 is a perspective view of one end of the compression member of my improved beam. Fig. 3 is a perspective view of one end of the tension member of the beam. Fig. 4 is a cross section taken on the line 4—4 of Fig. 1. Fig. 5 is a section similar to Fig. 4 and showing a modified form of the strut used in my improved beam. Fig. 6 is a section similar to Fig. 4 and showing a further modified form of the strut. Fig. 7 is a detail view illustrating a modified construction whereby the strut is locked in position on the tension member.

My invention relates generally to trussed brake beams, and more particularly to the means for uniting the ends of the compression and tension members of a trussed beam.

The subject matter of this application is similar to the subject matter shown and described in a companion application filed by me on July 24, 1909, Serial No. 509,326.

The principal objects of my invention are to construct a simple, inexpensive beam which may be readily assembled or taken apart, maintains its rigidity while in action or under load, and cannot be taken apart until the brake heads are removed.

Brake beams of trussed construction are obviously stronger for a given weight of material than are the so-called solid I or deck-section beams, but their superiority in strength, durability and economy of repairs is frequently questioned, for the reason that composite or built-up trussed beams tend to work loose at different joints and to develop lost motion.

I propose to provide a beam wherein the defects above referred to are overcome, which beam is easily assembled or taken apart for the purpose of repair, and in which beam a broken tension member or truss rod can be easily replaced, thereby preventing the discarding of the entire beam structure in case the tension member or truss rod is broken or becomes inoperative.

To the above purposes, my invention consists in certain novel features of construction and arrangement of parts hereinafter more fully described and claimed.

Referring by numerals to the accompanying drawings, 1 designates the compression member of the beam, which, in the present instance, is in the form of a channel, although an I-beam, T or U-shaped beam, may be utilized, and in some instances, the web or main body portion of the compression member is perforated, as shown in Fig. 2, in order to lighten the weight of said compression member. The ends of the compression member are upset or formed with integral heads 2, in the front faces of which are formed sockets or recesses 3, which are dovetailed in cross section and which taper gradually from their open outer ends toward their closed inner ends.

4 designates the tension member of my improved beam, the same being preferably formed of a flat strap or bar, and the ends thereof are provided with integral heads 5, which are approximately dovetailed in cross section and which taper from their outer ends toward their inner ends, and said heads fit snugly within the sockets or recesses 3 when the beam is assembled.

The brake heads 6, of any well known type, are provided with suitable openings, whereby they may be snugly fitted on to the conjoining ends of the compression and tension members, and passing through each head and through the corresponding end of the compression member 1 is a rivet 7, or like fastening device, which locks the head in proper position. Only one rivet or like fastening device is necessary for each head. Two holes in the same relation to the center line are provided in each head, thereby making said heads interchangeable, and avoiding the necessity of having to cast or form right and left hand heads.

The preferred form of strut shown in Figs. 1 and 4, comprises a body portion 8 which is slotted in the usual manner and adapted to receive the brake lever, and formed on or fixed to one end of this body portion is a sleeve 9 which embraces the central portion of the compression member 1.

Formed through the opposite end of the body portion 8 is an aperture 10, which is occupied by a small pin 11, the outer end of which passes through an aperture 12 formed in the central portion of the tension member 4. Thus one end of the strut is locked to the central portion of the tension member, and the pin 11 is prevented from backing out of its seat by a key 13, which passes transversely through the corresponding end of the strut and normally engages the head of the pin 11. When the beam is to be dismantled, the key 13 is removed from the strut 8, which permits the pin 11 to be driven out of the tension member backward into the lever slot, thus permitting this end of the strut to be disengaged from the tension member.

In the form of strut shown in Fig. 5, the same is formed in two parts 14 and 15, the same being united by means of a pin or bolt 16, and formed integral with the part 15 are ears 17 which engage the edges of the central portion of the tension member. When a beam having this form of strut is to be dismantled, the pin or bolt 16 is removed, which readily permits the parts 14 and 15 to be disengaged from one another.

In the form of strut shown in Fig. 6, the same is constructed in two parts 18 and 19, the latter being in the form of a sleeve which embraces the central portion of the compression member and detachably connected to the part 18 by means of a pin or bolt 20.

In the form of strut shown in Fig. 7, the end bearing upon the tension member is provided with integral ears 21, which, after the strut is properly positioned, are bent downward to engage the side edges of said strut.

My improved construction provides a beam which cannot be loosened or dismantled until the brake heads and strut are removed, and when in service the load or strain upon the beam tends to tighten the entire structure rather than to loosen the same, as is the case in many forms of built-up beams heretofore utilized.

My improved beam is very simple, combining as it does only the tension and compression members and the strut. The design of the beam permits the use of very shallow heads, which is quite important in beams utilized on trucks with short wheel bases, and there are no sharp corners in which fractures may be easily started, and no nuts, end projections, upset heads, or cotters bent around the ends of the compression member.

My improved form of beam can be easily repaired, and can be easily and quickly taken apart and assembled.

In assembling my improved beam, the sleeve 9 of the strut is slipped onto the compression member, after which the heads 5 are seated in the recesses 3 by a longitudinal movement of the tension member relative to the compression member, after which the central portion of the tension member is drawn away from the central portion of the compression member, and is finally forced on to the end of the strut 8. The pin 11 is now inserted in the coinciding apertures 10 and 12, after which the key 13 is placed in position to hold the said pin 11 in its seat. This assembling operation draws the heads 5 firmly into the recesses 3, and at the same time imparts the necessary camber to the compression member, and when the parts are locked in their assembled position a very strong, rigid construction is produced.

It will be readily understood that minor changes may be made in the form and construction of the various parts of the beam, without departing from the spirit of my invention.

I claim:

1. In a trussed brake beam, a compression member having solid ends in which are formed recesses, and a tension member, the ends of which are interlocked in the recesses in said ends.

2. In a trussed brake beam, a compression member, solid heads integral with the ends thereof, and a tension member, the ends of which are interlocked with the heads on the compression member.

3. In a trussed brake beam, a compression member, having solid ends in which are formed recesses, a tension member, the ends of which are interlocked in the recesses in said ends, and a strut interposed between the central portions of the compression and tension members.

4. In a trussed brake beam, a compression member, solid heads integral with the ends thereof, a tension member, the ends of which are interlocked with the heads on the compression member, and a strut interposed between the central portions of the compression and tension members.

5. In a trussed brake beam, a compression member, having solid ends in which are formed recesses, a tension member, the ends of which are interlocked in the recesses in said ends, a strut interposed between the central portions of the compression and tension members, and detachable means connecting one end of the strut and the tension member.

6. In a trussed brake beam, a compression member, solid heads integral with the ends thereof, a tension member, the ends of which are interlocked with the heads on the compression, a strut interposed between the central portions of the compression and tension members, and detachable means connecting the ends of the strut to the compression member.

7. In a trussed brake beam, a compression member having solid ends in which are formed recesses, a tension member, the ends of which are interlocked in the recesses in said ends, and interchangeable brake heads located upon the interlocking ends.

8. In a trussed brake beam, a compression member, solid heads integral with the ends thereof, a tension member, the ends of which are interlocked with the heads on the compression member, and interchangeable brake heads located upon the interlocking ends.

9. In a trussed brake beam, the combination with a compression member having solid ends, in which are formed recesses, a tension member, the ends of which latter interlock in said recesses, and interchangeable brake heads located upon and inclosing the interlocked ends of the compression and tension members.

10. In a trussed brake beam, the combination with a compression member having solid ends, in which are formed recesses, a tension member, the ends of which latter interlock in said recesses, interchangeable brake heads located upon and inclosing the interlocked ends of the compression and tension member, and a strut interposed between the central portions of the compression and tension members.

11. In a trussed brake beam, the combination with a compression member having solid ends, in which are formed recesses, a tension member, the ends of which latter interlock in said recesses, interchangeable brake heads located upon and inclosing the interlocked ends of the compression and tension member, a strut interposed between the central portions of the compression and tension members, and detachable means connecting one end of the strut and the tension member.

12. In a trussed brake beam, a compression member having solid ends in which are formed tapered recesses, a tension member the ends of which are formed to fit snugly in the tapered recesses, and interchangeable brake heads located upon the conjoined ends of the compression and tension members.

13. In a trussed brake beam, a compression member having solid ends in which are formed recesses which are dovetailed in cross section, a tension member, the ends of which are formed to fit snugly in said recesses, and interchangeable brake heads located upon the conjoined ends of the compression and tension members.

14. In a trussed brake beam, a compression member having solid ends in which are formed tapered recesses, a tension member the ends of which are formed to fit snugly in the tapered recesses, interchangeable brake heads located upon the conjoined ends of the compression and tension members, and a strut interposed between the central portions of said compression and tension members.

15. In a trussed brake beam, a compression member having solid ends in which are formed recesses which are dovetailed in cross section, a tension member, the ends of which are formed to fit snugly in said recesses, interchangeable brake heads located upon the conjoined ends of the compression and tension members, and a strut interposed between the central portions of said compression and tension members.

16. In a trussed brake beam, a compression member having solid ends in which are formed tapered recesses, a tension member, the ends of which are formed to fit snugly in the tapered recesses, interchangeable brake heads located upon the conjoined ends of the compression and tension members, a strut interposed between the central portions of said compression and tension members, and detachable means uniting the end of the strut and the tension member.

17. In a trussed brake beam, a compression member having solid ends in which are formed recesses which are dovetailed in cross section, a tension member, the ends of which are formed to fit snugly in said recesses, interchangeable brake heads located upon the conjoined ends of the compression members, a strut interposed between the central portions of said compression and tension members, and detachable means uniting the end of the strut and the tension member.

18. In a trussed brake beam, a strut interposed between the compression and tension members, and a locking pin detachably seated in the end of the strut and engaging the tension member.

19. In a trussed brake beam, a strut interposed between the compression and tension members, a locking pin detachably seated in the end of the strut and engaging the tension member, and detachable means for holding said pin in a locked position.

20. In a trussed brake beam, the combination with a compression member and a tension member, the ends of which are interlocked by wedge joints, of interchangeable brake heads fixed on the ends of the beam and inclosing the wedge joints.

21. In a trussed brake beam, a compression member and a tension member, the ends of which are united by dovetailed joints, of interchangeable brake heads located on the ends of the beam and inclosing said dovetailed joints.

22. In a trussed brake beam, the combination with a compression member and a tension member, the ends of which are interlocked by wedge joints, of interchangeable brake heads fixed on the ends of the beam and inclosing the wedge joints, and a strut interposed between the central portions of the compression and tension members, one end of which strut is locked to the tension member.

23. In a trussed brake beam, a compression member and a tension member, the ends of which are united by dovetailed joints, of interchangeable brake heads located on the ends of the beam and inclosing said dovetailed joints, and a strut interposed between the central portions of the compression and tension members, one end of which strut is locked to the tension member.

24. In a trussed brake beam, a compression member formed of a channel with integral heads arranged between the flanges of the channel at its ends.

25. In a trussed brake beam, a compression member formed of a channel with integral heads arranged between the flanges of the channel at its ends, there being recesses formed in said heads.

26. In a trussed brake beam, a compression member formed of a channel with integral heads arranged between the flanges of the channel at its ends, there being dovetailed recesses formed in said heads.

27. In a trussed brake beam, a compression member formed of a channel with integral heads arranged between the flanges of the channel at its ends, there being wedge-shaped recesses formed in said heads.

28. A brake beam comprising a compression member having a recess in its end, a tension member having a head fitting in said recess, and a strut, said compression and tension members being assembled by a relative longitudinal movement between them.

29. A brake beam comprising a compression member having a recess in its end, a tension member having a head fitting in said recess, and a strut, said compression and tension members being dismantled by a relative longitudinal movement between them.

30. A brake beam comprising a compression member having a recess in its end, a tension member having a head fitting in said recess, and a strut, said parts being assembled by separating the compression and tension members at the center of the beam and springing the strut into position.

31. A brake beam comprising a compression member, a tension member, and a strut, said parts being assembled by separating the compression and tension members at the center of the beam to effect a relative longitudinal interlocking movement between the ends of said parts and springing the strut into position.

32. In a trussed brake beam, a strut having a sleeve on one end, a locking pin removably arranged in the opposite end, and a key for locking pin.

In testimony whereof I hereunto affix my signature in the presence of two witnesses, this 2nd day of July 1909.

CHARLES H. WILLIAMS, Jr.

Witnesses:
   EDWARD T. WALKER,
   JOSEPH W. WEINLAND.